United States Patent
Rice et al.

(10) Patent No.: US 10,634,197 B2
(45) Date of Patent: Apr. 28, 2020

(54) CLUTCH MECHANISM AND METHOD FOR CONTROLLING FAN SPEED

(71) Applicant: ROLLS-ROYCE NORTH AMERICAN TECHNOLOGIES, INC., Indianapolis, IN (US)

(72) Inventors: Edward C. Rice, Indianapolis, IN (US); Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 397 days.

(21) Appl. No.: 15/493,975

(22) Filed: Apr. 21, 2017

(65) Prior Publication Data

US 2017/0350459 A1   Dec. 7, 2017

Related U.S. Application Data

(60) Provisional application No. 62/344,745, filed on Jun. 2, 2016.

(51) Int. Cl.
*F16D 35/00* (2006.01)
*F16D 47/06* (2006.01)
(Continued)

(52) U.S. Cl.
CPC ......... *F16D 35/005* (2013.01); *F01D 21/045* (2013.01); *F02C 7/36* (2013.01); *F04D 19/02* (2013.01); *F04D 25/02* (2013.01); *F04D 25/022* (2013.01); *F04D 27/0261* (2013.01); *F16D 47/06* (2013.01); *F16D 48/00* (2013.01); *F05D 2260/4023* (2013.01); *F05D 2270/02* (2013.01); *F05D 2270/09* (2013.01); *F05D 2270/334* (2013.01); *F16D 2300/22* (2013.01); *F16D 2500/104* (2013.01); *F16D 2500/10412* (2013.01); *F16D 2500/10468* (2013.01);
(Continued)

(58) Field of Classification Search
CPC ...... F16D 13/26; F16D 25/082; F16D 25/083; F16D 25/10; F16D 35/00; F16D 35/005; F16D 47/06
See application file for complete search history.

(56) References Cited

U.S. PATENT DOCUMENTS

| | | | | |
|---|---|---|---|---|
| 2,252,528 A | * | 8/1941 | Gluhareff | B64D 33/08 |
| | | | | 244/208 |
| 5,080,187 A | * | 1/1992 | Asano | B60K 17/3505 |
| | | | | 180/233 |

(Continued)

*Primary Examiner* — David R Morris
(74) *Attorney, Agent, or Firm* — McCracken & Gillen LLC

(57) ABSTRACT

A clutch mechanism includes a control member. The control member is adapted to receive motive power and includes a first dry clutch member and a first viscous clutch member. The clutch mechanism further includes an output member that includes a second dry clutch member and a second viscous clutch member. The first and second dry clutch members form a dry clutch and the first and second viscous clutch members form a viscous clutch. The clutch mechanism further includes an actuation arm coupled to at least one of the control and output members. The actuation arm is selectively controllable to effect relative movement of the control and output members such that one of the dry and viscous clutches is selectively engaged.

15 Claims, 7 Drawing Sheets

(51) Int. Cl.
*F16D 48/00* (2006.01)
*F04D 25/02* (2006.01)
*F02C 7/36* (2006.01)
*F04D 27/02* (2006.01)
*F01D 21/04* (2006.01)
*F04D 19/02* (2006.01)

(52) U.S. Cl.
CPC .. *F16D 2500/306* (2013.01); *F16D 2500/312* (2013.01); *F16D 2500/5102* (2013.01)

(56) References Cited

U.S. PATENT DOCUMENTS

| | | | | |
|---|---|---|---|---|
| 8,863,929 | B2 * | 10/2014 | Roczniak | F04D 25/022 |
| | | | | 192/57 |
| 9,121,461 | B1 * | 9/2015 | Scherman | F16D 25/0632 |
| 9,845,836 | B2 * | 12/2017 | Scherman | F01P 7/042 |
| 2012/0164002 | A1 * | 6/2012 | Roczniak | F04D 25/022 |
| | | | | 417/319 |
| 2015/0369306 | A1 * | 12/2015 | Scherman | F01P 7/042 |
| | | | | 192/57 |

\* cited by examiner

CLUTCH MECHANISM AND METHOD FOR CONTROLLING FAN SPEED

CROSS REFERENCE TO RELATED APPLICATIONS

The present application claims the benefit of U.S. Provisional Application No. 62/344,745, filed Jun. 2, 2016, entitled "Clutch Mechanism and Method for Controlling Fan Speed", the entire contents of which is incorporated herein by reference.

FIELD OF DISCLOSURE

The present subject matter relates to a clutch mechanism and to a method for controlling fan speed.

BACKGROUND

A rotating structure, such as a gas turbine engine associated with an aircraft, may include a fan having a plurality of fan blades. When the aircraft is in flight, the fan rotates at high speeds. The fan blades are well-balanced both statically and dynamically so that the fan is not a source of significant dynamic loads. In some situations, however, a bird, a piece of debris, or another object may strike the fan or another part of the engine during operation, thereby causing a fan blade or at least a portion thereof to break-off from the fan. Such a blade-out event can cause the fan to become unbalanced and thus a source of significant vibration. This vibration is undesirably transmitted to the engine mount and airframe of the aircraft. One way to reduce or eliminate the vibration is to stop the rotation of the damaged engine. If the rotation of the fan is stopped, however, the engine exerts significant drag on the aircraft, which not only decreases airspeed and thereby increases the time required to get the aircraft safely to ground, but also complicates the process of flying the aircraft.

SUMMARY

According to one aspect, a clutch mechanism includes a control member. The control member is adapted to receive motive power and includes a first dry clutch member and a first viscous clutch member. The clutch mechanism further includes an output member that includes a second dry clutch member and a second viscous clutch member. The first and second dry clutch members form a dry clutch and the first and second viscous clutch members form a viscous clutch. The clutch mechanism further includes an actuation arm coupled to at least one of the control and output members. The actuation arm is selectively controllable to effect relative movement of the control and output members such that one of the dry and viscous clutches is selectively engaged.

According to another aspect, a rotating structure includes a fan proximal an intake of the rotating structure, a turbine, and a clutch mechanism. The clutch mechanism includes a control member that receives motive power from the turbine via an input shaft. The clutch mechanism further includes an output member that provides motive power to the fan via an output shaft. The control member includes a first dry clutch member and a first viscous clutch member. The output member includes a second dry clutch member and a second viscous clutch member. The first and second dry clutch members form a dry clutch and the first and second viscous clutch members form a viscous clutch. The clutch mechanism further includes an actuation arm operably coupled to at least one of the control and output members. The actuation arm is selectively moveable to effect relative movement between the control and output members such that one of the dry and viscous clutches is selectively engaged.

According to yet another aspect, a method of stabilizing a rotating structure includes determining a vibration indicator associated with the rotating structure. The rotating structure includes a clutch mechanism. The clutch mechanism includes a control member that receives motive power from a turbine of the rotating structure and an output member that provides motive power to a fan of the rotating structure. The method further includes determining a drag associated with the rotating structure. The method further includes selectively controlling, by the clutch mechanism, the fan speed based on the vibration indicator and the drag such that the vibration indicator and the drag decrease toward respective optimal minimums.

Other aspects and advantages will become apparent upon consideration of the following detailed description and the attached drawings wherein like numerals designate like structures throughout the specification.

DETAILED DESCRIPTION

Figure 1:
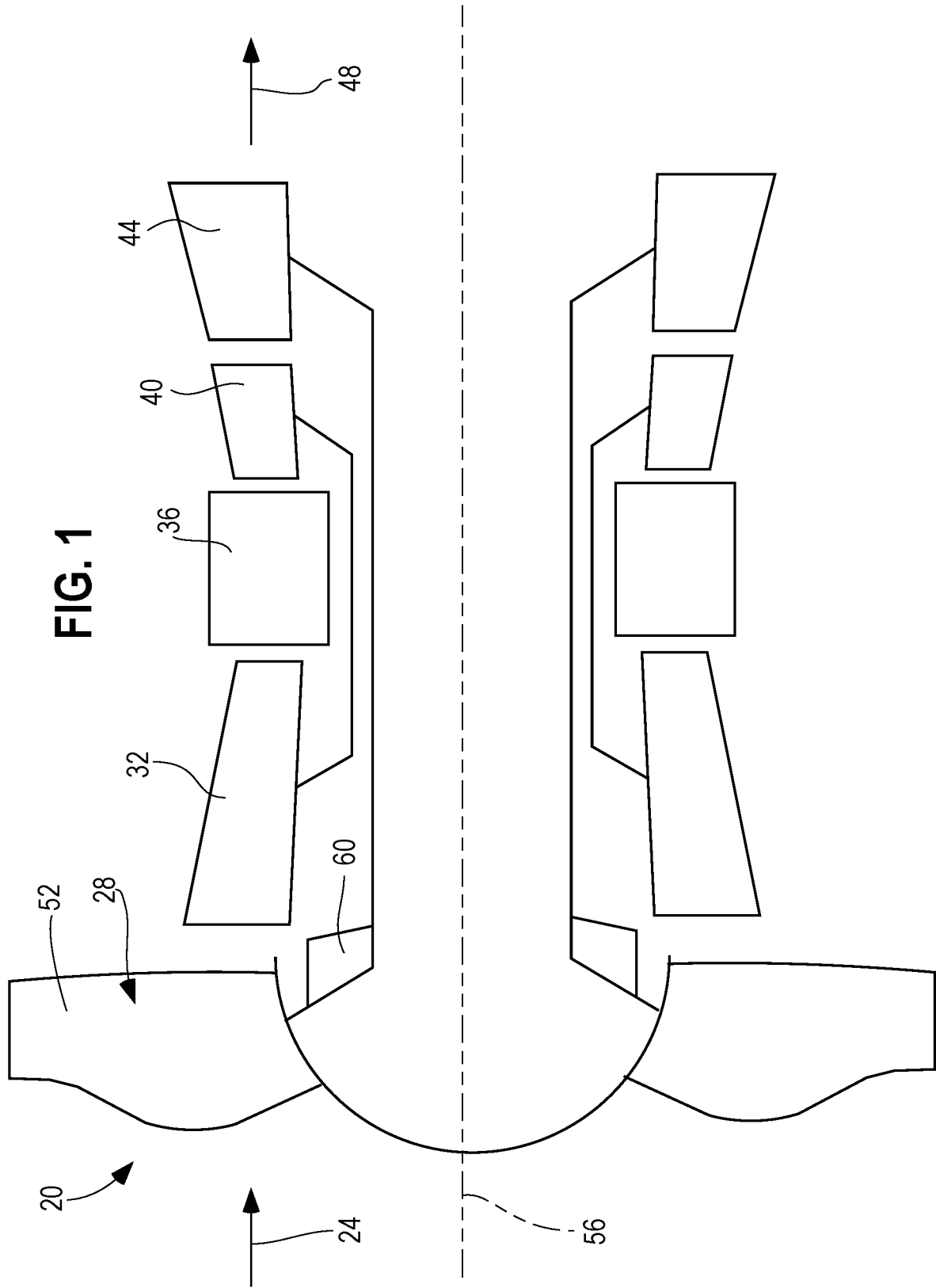
FIG. 1 is a schematic cross-sectional side view of an exemplary rotating structure in the form of a gas turbine engine having a clutch mechanism.

Referring now to FIG. 1, an exemplary rotating structure in the form of a gas turbine engine 20 includes an intake 24, a fan 28, a compressor 32, a combustion chamber 36 that receives compressed air from the compressor 32, a high-pressure turbine 40, a low-pressure turbine 44 (the high-pressure and low-pressure turbines 40 and 44 convert rapidly expanding combusting fuel and air into rotary motive power), and an exhaust 48. The rotary motive power produced by the low-pressure turbine 44 is provided to the fan 28, which includes a plurality of fan blades 52 and rotates about a central longitudinal axis 56 of the turbine engine 20. Still referring to FIG. 1, a clutch mechanism 60 is operably coupled to the low-pressure turbine 44 and to the fan 28 in order to control the speed of the fan 28.

Figure 2:
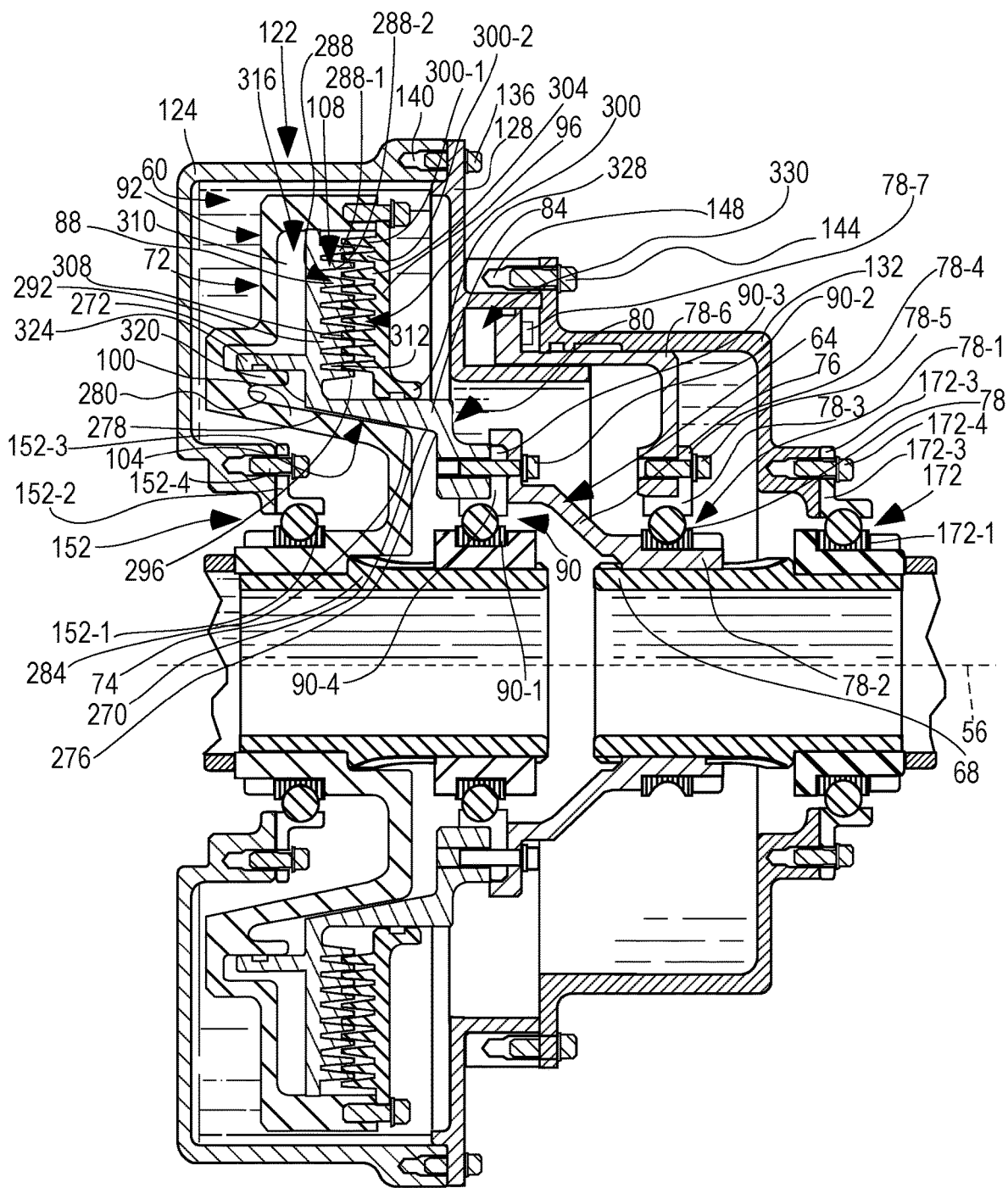
FIG. 2 is a cross-sectional side elevational view of the clutch mechanism of FIG. 1, illustrating the clutch at an intermediate position.

Referring now to FIG. 2, the clutch mechanism 60 includes a control member 64 coupled by a splined connection to an input shaft 68. The input shaft 68, in turn, is coupled to and adapted to receive motive power from the low-pressure turbine 44. The clutch mechanism 60 further includes an output member 72 operably coupled to the control member 64 and adapted to receive motive power therefrom. Moreover, the output member 72 is rigidly coupled to an output shaft 74 and is adapted to provide motive power thereto. The output shaft 74, in turn, is coupled to the fan 28 and is adapted to transmit motive power thereto.

The splined connection between the control member 64 and the input shaft 68 rigidly couples the input shaft 68 to a first cylindrical end comprising an input member 76 of the control member 64 in a circumferential direction so that rotary motive power is transferred from the input shaft 68 to the control member 64, but allows some axial movement of the control member 64 relative to the input shaft 68. An inner raceway 78 of a first bearing assembly 78-1 is circumferentially and axially secured about the first cylindrical end 78-2 for rotation therewith. An outer raceway 78-3 of the first bearing assembly 78-1 includes a radially extending flange 78-4 that is rigidly secured by one or more fasteners 78-5 to an axially displaceable actuation arm 78-6 Ball bearings or other bearings are disposed between the inner raceway 78 and the outer raceway 78-3 to permit relative rotation of the raceways 78 and 78-3 A controllable actuator 78-7, such as a piston and cylinder device, an electric motor, or any other source of mechanical power, is coupled to the axially displaceable actuation arm 78-6 and is selectively operable by exemplary control apparatus 78-8 shown in FIG. 4 to move the arm 78-6 axially, and thus, effect movement of the control member 64.

As further shown in FIG. 2, the control member 64 has a disc or funnel-like shape and further includes an engagement member 80 coupled to the input member 76. Optionally, the input member 76 and the engagement member 80 may be integral with one another, although they may be separate elements that are held together, e.g., by fasteners, welds, a combination of the two, or the like. The engagement member 80, which may itself be an integral member or which may comprise separate elements that are fastened or otherwise secured together, includes an input dry clutch member 84 and an input viscous clutch member 88. The clutch mechanism 60 further includes a second bearing assembly 90 coupled between the control member 64 and the output shaft 74. The second bearing assembly 90 includes an inner raceway 90-1 that is coupled by a splined connection to the output shaft 74 so that limited axial movement is possible between the bearing assembly 90 and the output shaft 74 while still providing radial support for the input member 76 and the engagement member 80. Circumferentially spaced fasteners 90-2 extend through aligned bores in the input member 76, a radially extending flange 90-3 of an outer raceway 90-4 of the second bearing assembly 90 and into threaded bores of the engagement member 80 to hold such elements together.

As further shown in FIG. 2, the output member 72 has a disc-like shape and includes a forward member 92 and an output viscous clutch member 96 coupled to the forward member 92. Optionally, the output viscous clutch member 96 and the forward member 92 may be integral. The forward member 92 is rigidly coupled in axial and circumferential directions to the output shaft 74 and includes an output dry clutch member 100. The input dry clutch member 84 and the output dry clutch member 100 together form a dry clutch 104 and are disposed opposite one another, as shown in FIG. 2. The input viscous clutch member 88 and the output viscous clutch member 96 together form a viscous clutch 108 and are disposed opposite from one another, as further shown in FIG. 2. Optionally, the control member 64 and the output member 72 may have alternative shapes that can effect alternative engagement of a dry clutch and a viscous clutch and/or gradual engagement of a viscous clutch.

As further shown in FIG. 2, the clutch mechanism 60 is at least partially enclosed in a clutch housing 122 that includes a first member 124, a second member 128 coupled to the first member 124, and a third member 132 coupled to the second member 128. The first member 124 may have a disk-like shape and is secured to the second member 128 using circumferentially spaced first housing fasteners 136 that extend through the second member 128 and into threaded first housing apertures 140 in the first member 124. The second member 128 has a ring-like shape and is secured to the third member 132 using circumferentially spaced second housing fasteners 144 that extend through the third member 132 and into second housing apertures 148 in the second member 128. In alternative embodiments, one or more members 124, 128, 132 of the housing 122 may be integral or one or more may comprise separate members that are fastened or welded together.

As further shown in FIG. 2, the forward member 92 is secured to the output shaft 74 such that the forward member 92 and the output shaft 74 rotate about the axis 56 at identical speeds. The forward member 92 is able to rotate with respect to the stationary clutch housing 122 because of a third bearing assembly 152 disposed between the housing 122 and the forward member 92. The third bearing assembly 152 includes an inner raceway 152-1 coupled rigidly to the output shaft 74 and an outer raceway 152-2 having a radially directed flange 152-3 rigidly secured by circumferentially spaced fasteners 152-4 into threaded bores in the first member 124. A fourth bearing assembly 172 is disposed between the stationary third member 132 and the input shaft 68 to permit relative movement of the input shaft 68. The fourth bearing assembly 172 includes an inner raceway 172-1 rigidly secured to the input shaft 68, an outer raceway 172-2 having a radially directed flange 172-3 rigidly secured by circumferentially spaced fasteners 172-4 into threaded bores in the third member 132.

Optionally, other fastening means may be used besides fasteners 78-5, 90-2, 136, 144, 152-4, 172-4 and associated threaded bores.

Figure 2A:
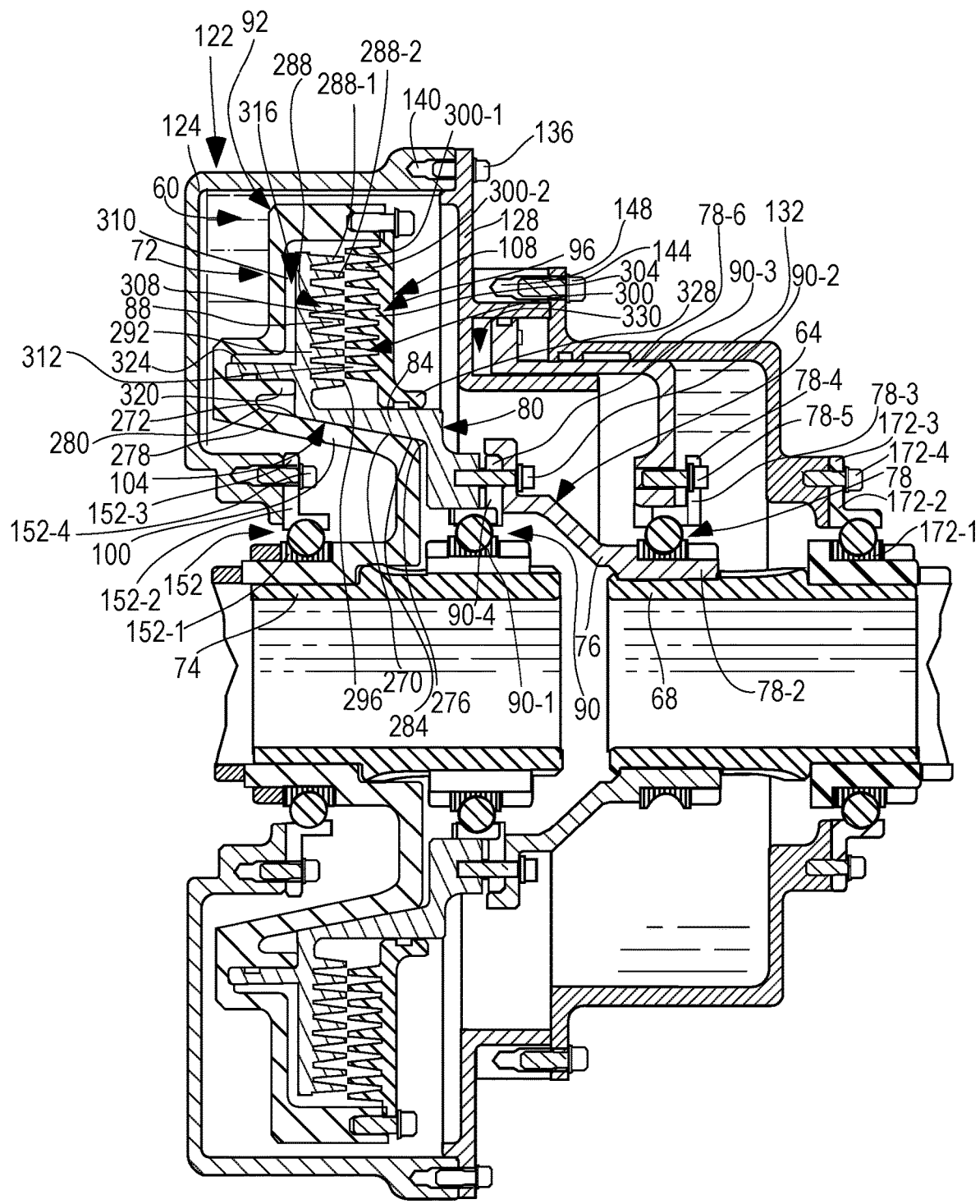
FIG. 2A is a cross-sectional side view of the clutch mechanism of FIG. 2 illustrating the clutch at a first extreme position resulting in a dry clutch of the clutch mechanism being in a fully engaged condition.
Figure 2B:
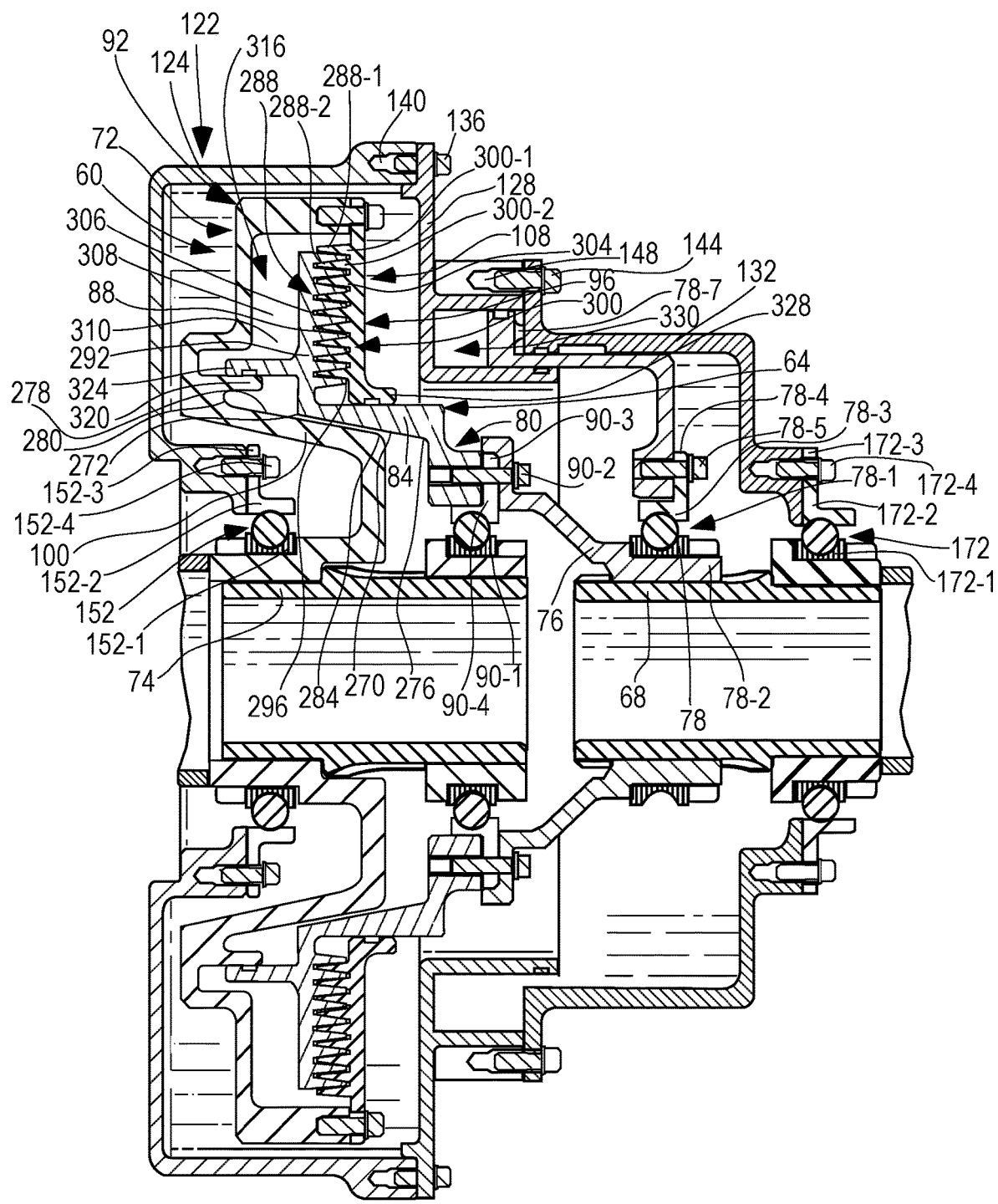
FIG. 2B is a cross-sectional side view of the clutch mechanism of FIG. 2 illustrating the clutch at a second extreme position resulting in a viscous clutch of the clutch mechanism being in a fully engaged condition.

Still referring to FIG. 2, axial translation of the control member 64 causes axial translation of the first bearing assembly 90 along the splined connection with the output shaft 74. This, in turn causes axial translation of the engagement member 80. As noted in greater detail hereinafter, such translation enables selective engagement of either the dry clutch 104 (as seen in FIG. 2A) or the viscous clutch 108. In the latter case, the viscous clutch 108 can be partially (as seen in FIG. 2) or fully engaged (as seen in FIG. 2B) to permit selected variable motive power transfer from the input shaft 68 to the output shaft 74.

Referring again to FIG. 2B, a radially inner surface 270 of the input dry clutch member 84 of the control member 64 has a frustoconical shape having a greater diameter at a forward end 272 than an aft end 276. As further shown, a radially outer surface 278 of the output dry clutch member 100 has a frustoconical shape having a greater diameter at a forward end 280 than an aft end 284. In this way, the input dry clutch member 84 serves as a first portion of the dry clutch 104 that partially encloses the output dry clutch member 100, which serves as a complementary second portion. The shape of the dry clutch 104 is such that axial movement of the control member 64 in a forward direction causes engagement of the dry clutch 104, thereby effecting transfer of motive force (i.e., torque) from the control member 64 to the output member 72, as shown in FIG. 2A.

As further shown in FIG. 2A, the dry clutch 104 is in a state of maximum engagement, which causes the control member 64 and the output member 72 to rotate at an identical speed, thereby causing the input shaft 68 and the output shaft 74 to rotate at an identical speed. Such synchronized rotation of the input shaft 68 and the output shaft 74 causes the fan 28 to rotate at a speed determined by a speed of the low-pressure turbine 44. Such a state of full engagement of the dry clutch 104 is maintained during normal flight of an aircraft including the engine 20.

Referring again to FIG. 2A, the input viscous clutch member 88 of the control member 64 includes a plurality of circular plates 288, each surrounding the axis 56 and extending in an axial direction, with at least a first circular plate 288-1 having a greater diameter than a second circular plate 288-2. Each of the circular plates 288 has a greater thickness at a forward end 292 than an aft end 296. As further shown in FIG. 2A, the output viscous clutch member 96 includes a plurality of circular plates 300 each surrounding the axis 56 and extending in an axial direction, with at least a first circular plate 300-1 having a greater diameter than a second circular plate 300-2. Each of the circular plates 300 has a greater thickness at an aft end 304 than a forward end 308, as further shown in FIG. 2A. The plurality of circular plates 288 are configured to move into and out of the complementary circular plates 300 as the control member 64 is moved relative to the output member 72, as shown in FIG. 2B. For example, the second circular plate 300-2 is disposed radially between the first and second circular plates 288-1, 288-2 and fits into a space between the first and second circular plates 288-1, 288-2 as the control member 64 is moved relative to the output member 72, as shown in FIG. 2B. The viscous clutch 108 formed by the circular plates 288, 300.

Referring again to FIG. 2A, a viscous fluid 310, such as a silicone-based fluid, occupies a space 312 between the circular plates 288 and the circular plates 300. The space 312 is included in a fluid chamber 316 that contains the viscous fluid 310. The fluid chamber 316 is defined by a first seal 320 integral with the forward member 92 and a second seal 324 adjacent the first seal 320 and integral with the input viscous clutch member 88. The fluid chamber 316 is further defined by a third seal 328 integral with the output viscous clutch member 96 and adjacent to a portion of the engagement member 80. As the circular plates 288 are moved closer to the circular plates 300 during increased engagement of the viscous clutch 108 (as shown in FIG. 2B), the viscous fluid 310 transfers increased motive power from the circular plates 288 to the circular plates 300, thereby transferring increased motive power to the output member 72 and thus increasing the speed of the fan 28. It should be noted that during increased engagement of the viscous clutch 108, a greater surface area of the circular plates 288 is in close proximity to a surface area of the circular plates 300, as shown in FIG. 2B. It should also be noted that in the illustrated embodiment, disengagement of the dry clutch 104 and increased engagement of the viscous clutch 108 are effected by moving the control member 64 axially in one direction. In alternative embodiments, disengagement of the dry clutch 104 may be effected by moving the control member 64 axially in one direction and increased engagement of the viscous clutch 108 may be effected by moving the control member 64 axially in another direction. Additionally, or alternatively, the clutch mechanism 60 may be shaped such that disengagement of the dry clutch 104 by movement of the control member 64 axially in one direction effects maximum engagement of the viscous clutch 108 and further movement of the control member 64 in the one direction effects decreased engagement of the viscous clutch 108.

In FIG. 2B, the viscous clutch 108 is shown in a maximally engaged state that transfers maximum motive power to the output member 72 as contrasted with the partially engaged viscous clutch 108 shown in FIG. 2. Nevertheless, maximum engagement of the viscous clutch 108 transfers less motive power to the output member 72 than engagement of the dry clutch 104, shown in FIG. 2A.

Referring again to FIG. 2, the actuation arm 78-6 in the form of a piston arm is operably coupled to the input member 76 of the control member 64 in order to control the axial movement of the input member 76. The arm 78-6 is coupled to an actuator 78-7 disposed in an actuator housing 330, as further shown in FIG. 2. The arm 78-6 is selectively controllable, using the actuator 78-7, to effect relative axial movement between the control and output members 64, 72 such that one of the dry and viscous clutches 104, 108 is selectively engaged in order to control a rotational speed of the output member 72.

According to an embodiment, the dry clutch 104 may be disengaged after a blade-out event in order to decrease dynamic imbalance loads/vibrations. In prior systems such disengagement resulted in the fan 28 coming substantially to a stop, thereby increasing drag on an aircraft engine and an aircraft as a whole. In the illustrated embodiment, once the dry clutch 104 is disengaged, the viscous clutch 108 is selectively and controllably engaged to reduce such drag while minimizing vibration. According to a specific embodiment, the viscous clutch 108 may be gradually engaged to cause the fan 28 to rotate at an intermediate speed lower than a speed associated with the dry clutch 104 being engaged. More specifically, the arm 78-6 may be dynamically controlled based on detection of imbalanced loads and drag such that the viscous clutch 108 is engaged at a level that results in both imbalance loads/vibration and drag reaching optimal minimums, or at least levels below thresholds.

Referring again to FIG. 2B, a radially inner surface 270 of the input dry clutch member 84, where engagement occurs, faces generally forward whereas generally aft-facing surfaces of the input viscous clutch member 88 are moved into engagement. More generally, the input dry clutch member 84 is moved in one direction into engagement with the output dry clutch member 100 and the input viscous clutch member 88 is moved in a second direction opposite the one direction into increased engagement with the output viscous clutch member 96. As further shown in FIG. 2B, a radially outer surface 278 of the output dry clutch member 100, where engagement occurs, faces generally aft whereas it is generally forward-facing surfaces of the output viscous clutch member 96 that undergo engagement. More generally, the output dry clutch member 100 is engaged on a side opposite the side of engagement of the output viscous clutch member 96.

Figure 3:
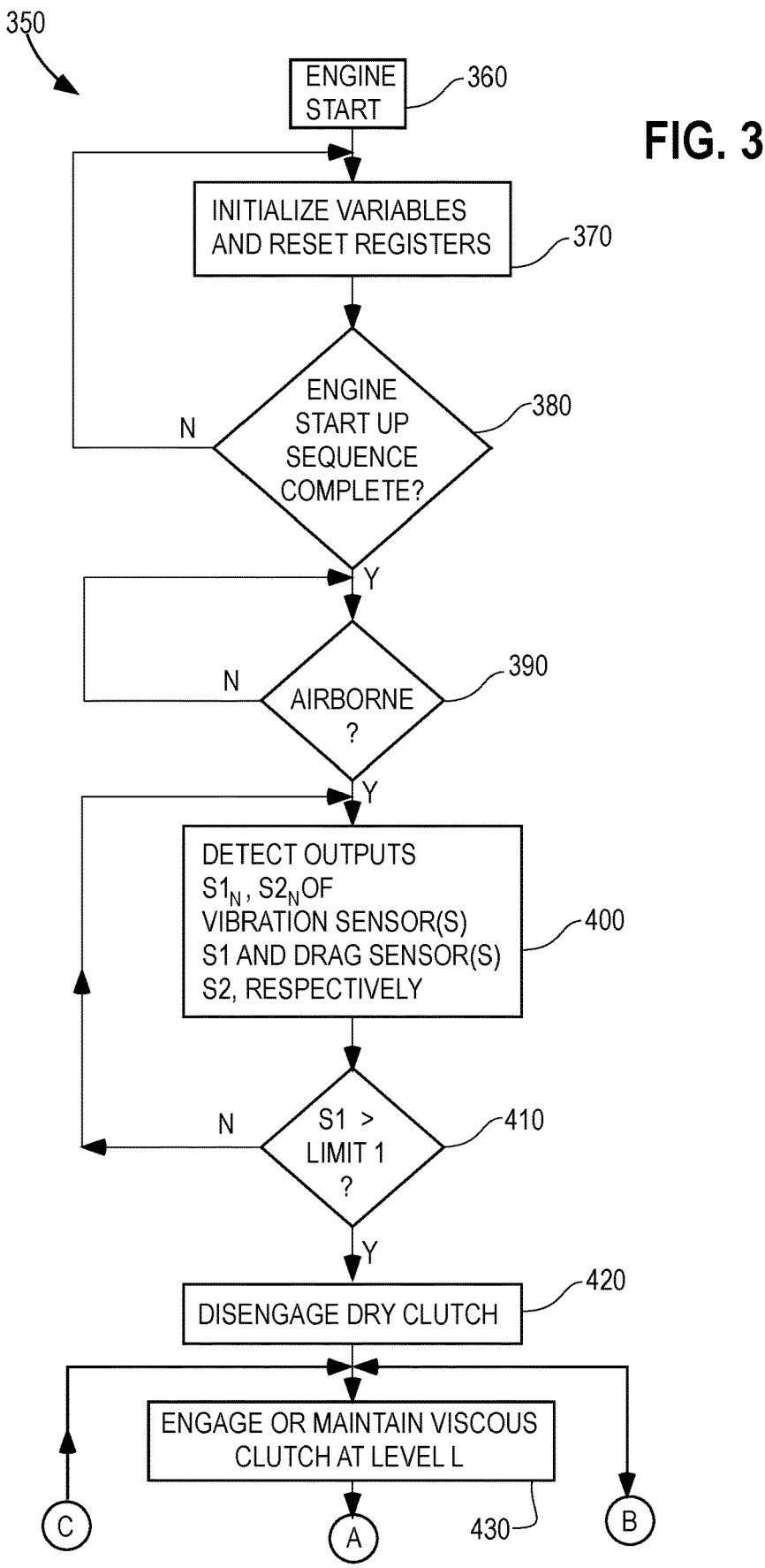
FIGS. 3 and 3A show a flowchart of programming illustrating a method of controlling fan speed using the clutch mechanism of FIG. 2.
Figure 4:
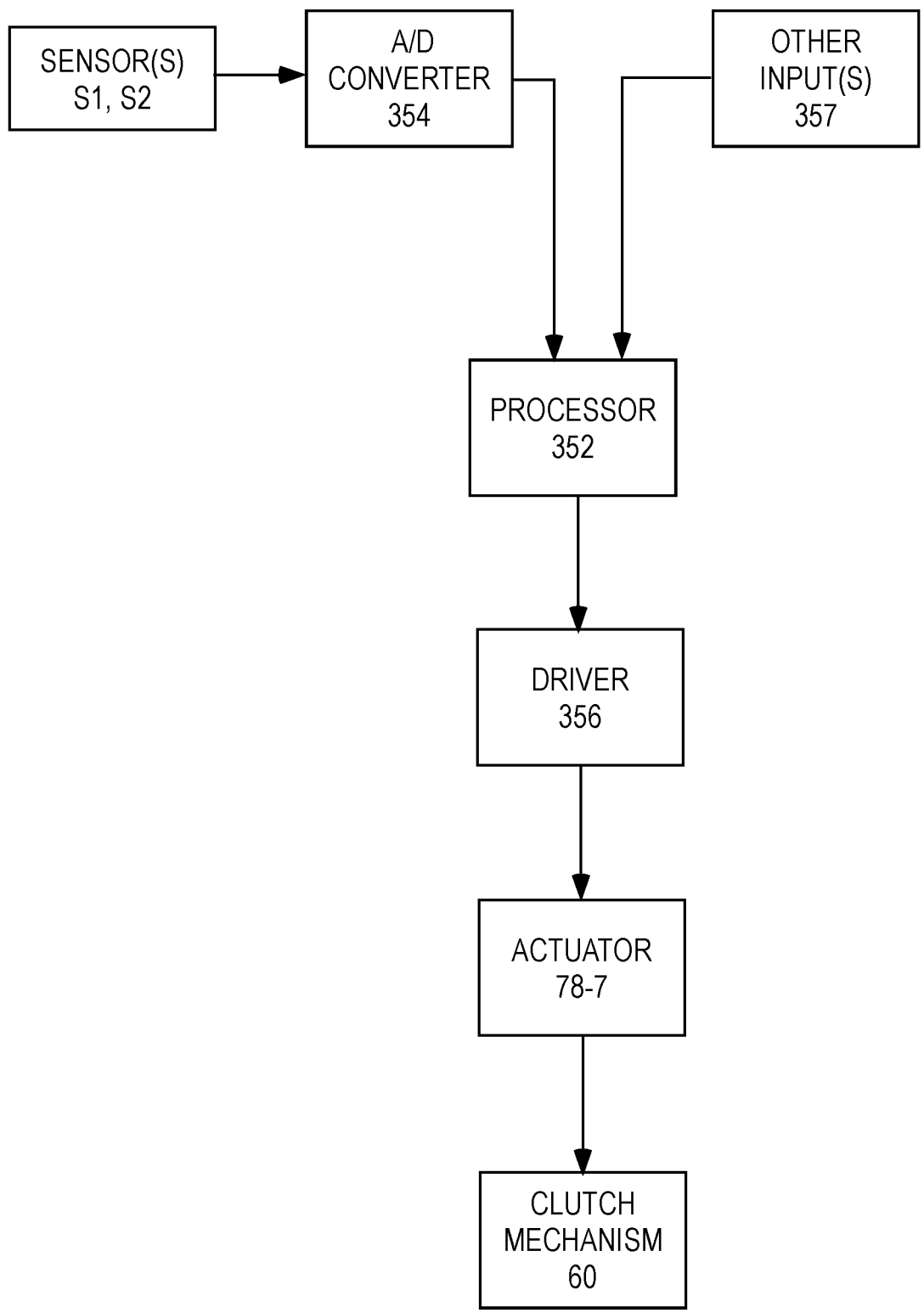
FIG. 4 is a block diagram of circuits for controlling the actuator of FIGS. 2, 2A, and 2B.

Referring now to FIG. 3, exemplary programming 350 is illustrated for controlling a speed of the fan 28 using the clutch mechanism 60 in order to stabilize the engine 20. The programming 350 is undertaken by a processor 352 seen in FIG. 4 that is responsive to one or more sensed parameters and which controls the actuator 78-7. If necessary, interface circuits, such as one or more analog-to-digital converters 354 and driver circuit(s) 356 may be included as shown in FIG. 4. Optionally, the processor 352 may be responsive to one or more other inputs 357, as shown in FIG. 4.

Referring again to FIG. 3, the programming 350 begins at a block 360, which starts the engine 20. Following the block 360, the block 370 initializes variables including an imbalance load or vibration variable $S1_N$ detected by a vibration sensor S1 and a drag variable $S2_N$ detected by a drag sensor S2 and/or calculated from a combination of other sensors S2. Sensor(s) S1 and S2 are shown in FIG. 4. The vibration sensor S1 may include an accelerometer. The imbalance load or vibration variable $S1_N$ measures dynamic imbalance loads experienced by the engine 20 and/or other components of the aircraft such as the engine mount and the airframe. Such imbalance loads may be caused, for example, by the fan 28 rotating after a blade-out event has removed a portion of at least one fan blade 52. The drag variable $S2_N$ measures the drag associated with the fan 28 being in a stationary state or rotating at less than full speed (e.g., this may occur because the dry clutch 104 is disengaged).

Referring again to FIG. 3, the block 370 resets registers that store previously detected values of $S1_N$ and $S2_N$. Following the block 370, the block 380 determines whether the engine start-up sequence is complete, as further shown in FIG. 3. As further shown, if the engine start-up sequence is not complete (Block 380—NO), control returns to the block 370. As further shown in FIG. 3, if the engine start-up sequence is complete (Block 380—YES), control proceeds to block 390, which determines whether the aircraft that includes the engine 20 is airborne. If the aircraft is not airborne, control remains with the block 390 (Block 390 NO). It should be noted here that, generally, the dry clutch 104 is engaged when the aircraft is airborne.

If the aircraft is airborne (Block 390—YES), control proceeds to block 400, which detects outputs $S1_N$, $S2_N$ of the vibration sensor(s) and drag sensor(s), respectively, as further shown in FIG. 3. Control from the block 400 thereafter passes to block 410. Block 410 determines whether vibration variable $S1_N$ is greater than a first limit. The first limit is based on a level of vibration or imbalance load $S1_N$ associated with a blade-out event of the fan 28. Specifically, a vibration $S1_N$ greater than the first limit indicates that a blade-out event has occurred and a vibration $S1_N$ less than the first limit indicates that no blade-out event has occurred. It should be noted that use of greater than is to be construed to cover both greater than and equal to, unless clearly contradicted by context. Likewise, use of less than is to be construed to cover both less than and equal to, unless clearly contradicted by context.

If $S1_N$ is not greater than the first limit (Block 410—NO), control returns to the block 400, which continues to detect outputs $S1_N$, $S2_N$. If, however, the vibration $S1_N$ is greater than the first limit, control passes to block 420. As shown in FIG. 3, block 420 disengages the dry clutch 104. Disengaging the dry clutch 104 may include causing the arm 78-6 to move aft, thereby causing movement of the control member 64 toward aft (such disengagement can be seen in the transition from FIG. 2A to FIG. 2). Disengaging the dry clutch 104 may result in the fan 28 coming substantially to a stop, thereby causing an increase in the drag $S2_N$, which, in turn, increases the time required to get the aircraft safely on the ground after a blade-out event.

After the block 420, control passes to block 430, which engages or maintains the viscous clutch 108 at level L, as shown in FIG. 3, in order to reduce the drag $S2_N$. The block 430 may engage the viscous clutch 108 at some initial level L, for example, the level L shown in FIG. 2. The initial level L may be based on factors such as a speed of the aircraft, an altitude of the aircraft, air-pressure of ambient air, and/or the drag $S2_N$. These determinations may be made manually or automatically by the processor 352.

Figure 3A:
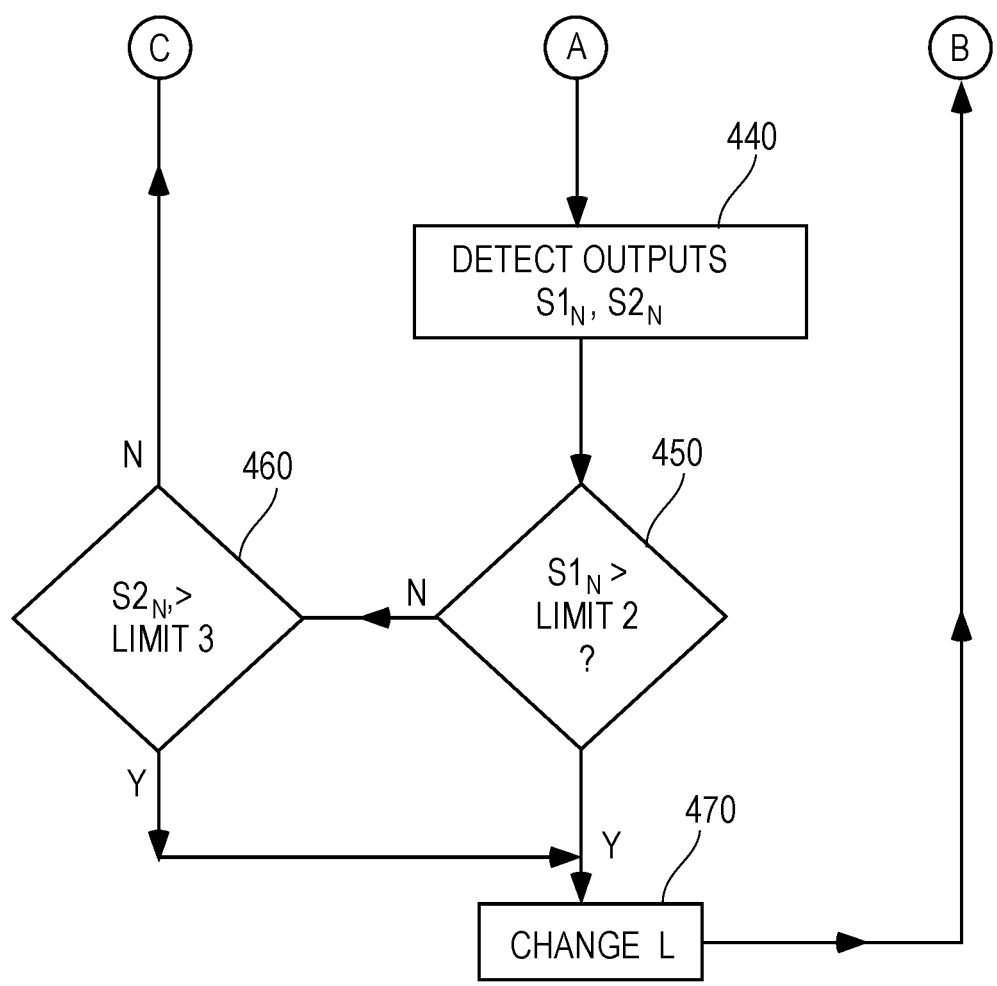

Thereafter, control from the block 430 passes to block 440, as shown in FIGS. 3 and 3A. As shown in FIG. 3A, the block 440 detects variables $S1_N$ and $S2_N$ using the vibration sensor(s) and the drag sensor (s), respectively. Control thereafter passes to block 450, as further shown. The block 450 determines whether the vibration $S1_N$ is greater than a second limit. The second limit may be based on an unacceptable level of vibration that results in damage to components of the aircraft or risk of injury to passengers. The second limit may be the same as the first limit associated with the block 410 or may be different. Optionally, the second limit may be lower than the first limit of the block 410. The vibration $S1_N$ being greater than the second limit indicates an unacceptable level of vibration $S1_N$ and the vibration $S1_N$ not being greater than the second limit indicates an acceptable level of vibration $S1_N$.

If the vibration $S1_N$ is not greater than the second limit (Block 450—NO), control proceeds to block 460, as shown in FIG. 3A. The block 460 determines whether the drag $S2_N$ is greater than a third limit. The drag $S2_N$ being greater than the third limit may indicate that the drag $S2_N$ is so high that the speed of the aircraft and the time to reach safety would be negatively affected in an unacceptable manner. The third limit may be determined based on the speed of the aircraft, the altitude of the aircraft, the air-pressure of the ambient air, the vibration $S1_N$, distance to nearest airport, weather conditions on path to nearest airport, amount of remaining fuel, or the like. These determinations may be made manually or automatically by the processor 352. The drag $S2_N$ not being greater than the third limit may indicate that the drag $S2_N$ is acceptably low.

If the vibration $S1_N$ is not greater than the second limit (Block 450—NO) and the drag $S2_N$ is not greater than the third limit (Block 460—NO), control returns to the block 430, which maintains the viscous clutch 108 at the level L and control thereafter passes to the block 440, which continuously detects the variables $S1_N$ and $S2_N$. In some situations, such a level L may be maintained throughout the rest of the flight.

If the vibration $S1_N$ is greater than the second limit (Block 450—YES), control passes to block 470, as further shown in FIG. 3A. The block 470 changes the level of engagement L of the viscous clutch 108. In particular, if the vibration $S1_N$ is greater than the second limit, the level of engagement L of the viscous clutch 108 is decreased until the vibration $S1_N$ is less than the second limit.

If the drag $S2_N$ is greater than the third limit (Block 460—YES), control passes to the block 470, which changes the level of engagement L of the viscous clutch 108. In particular, if the vibration $S2_N$ is greater than the third limit, the level of engagement L of the viscous clutch is increased until the vibration $S2_N$ is less than the third limit. In some situations, decreasing the vibration $S1_N$ may take precedence over decreasing the drag $S2_N$. In other situations, decreasing the drag $S2_N$ may take precedence over decreasing the vibration $S1_N$. Optionally, the engagement level L may be changed even after the $S1_N$ is lower than the second limit and the $S2_N$ is lower than the third limit. Such changes may cause the $S1_N$ and the $S2_N$ to decrease to optimal minimums below the second and third limits, respectively.

INDUSTRIAL APPLICABILITY

In summary, a clutch mechanism and a method for controlling fan speed using the clutch mechanism assists in reducing imbalance loads or vibrations associated with blade-out events while also reducing undesirable drag associated with a stopped fan.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. A clutch mechanism, comprising:
    a control member adapted to receive motive power and comprising a first dry clutch member and a first viscous clutch member;
    an output member comprising a second dry clutch member and a second viscous clutch member, the first and second dry clutch members forming a dry clutch and the first and second viscous clutch members forming a viscous clutch wherein the viscous clutch members are movable to a non-interleaving position; and
    an actuation arm coupled to at least one of the control and output members, the actuation arm being selectively controllable to effect relative movement of the control and output members such that one of the dry and viscous clutches is selectively engaged, wherein when the dry clutch is engaged the viscous clutch members are in the non-interleaving position.

2. The clutch mechanism of claim 1, wherein the relative movement between the control and output members is movement of the control member in a first direction, the movement of the control member in the first direction causing disengagement of the dry clutch and increased engagement of the viscous clutch.

3. The clutch mechanism of claim 2, wherein the first dry clutch member includes a surface, the surface has a first end associated with the first direction and a second end associated with a second direction opposite the first direction, wherein the surface has a greater diameter at the second end than at the first end.

4. The clutch mechanism of claim 3, wherein the second dry clutch member is at least partially enclosed by the first dry clutch member.

5. The clutch mechanism of claim 1, wherein the first viscous clutch member engages the second viscous clutch member on a side of the first viscous clutch member facing a first direction.

6. The clutch mechanism of claim 5, wherein the first dry clutch member engages the second dry clutch member on a side of the first dry clutch member facing a second direction opposite the first direction.

7. The clutch mechanism of claim 1, wherein the first viscous clutch member comprises at least one circular plate surrounding an axis of rotation of the control member, the circular plate extending in a first direction along the axis.

8. The clutch mechanism of claim 7, wherein the at least one circular plate is a first circular plate having a diameter greater than a second circular plate of the first viscous clutch member.

9. The clutch mechanism of claim 8, wherein the second viscous clutch member comprises a third circular plate surrounding the axis and extending in a second direction opposite the first direction, wherein the third circular plate has a diameter greater than the second circular plate and less than the first circular plate such that the third circular plate is adapted to fit in a space between the first and second circular plates.

10. The clutch mechanism of claim 9, wherein an increased surface area of the first and second circular plates is proximal to a surface area of the third circular plate during increased engagement of the viscous clutch, the increased engagement causing increased transfer of motive power from the control member to the output member.

11. The clutch mechanism of claim 1, wherein the control member receives motive power from a turbine of a rotating structure, the output member receives motive power from the control member, and the output member provides motive power to a fan of the rotating structure.

12. A rotating structure, comprising:
    a fan proximal an intake of the rotating structure;
    a turbine; and
    a clutch mechanism comprising a control member receiving motive power from the turbine via an input shaft and an output member providing motive power to the fan via an output shaft, the control member comprising a first dry clutch member and a first viscous clutch member, the output member comprising a second dry clutch member and a second viscous clutch member, the first and second dry clutch members forming a dry clutch and the first and second viscous clutch members forming a viscous clutch, wherein the viscous clutch members are movable to a non-interleaving position, the clutch mechanism further comprising an actuation arm operably coupled to at least one of the control and output members, the actuation arm being selectively moveable to effect relative movement between the control and output members such that one of the dry and viscous clutches is selectively engaged, and wherein when the dry clutch is engaged the viscous clutch members are in the non-interleaving position.

13. The rotating structure of claim 12, wherein the relative movement between the control and output members is movement of the control member in a first direction, the movement of the control member causing disengagement of the dry clutch and increased engagement of the viscous clutch.

14. The rotating structure of claim 13, wherein the control member is operably coupled to the output shaft by a bearing assembly such that the control member can be moved axially relative to the output shaft and can rotate relative to the output shaft.

15. The rotating structure of claim 13, wherein the actuation arm is operably coupled to the control member by a bearing assembly such that the actuation arm can cause movement of the control member along the input shaft and such that the control member can rotate relative to the actuation arm.

\* \* \* \* \*